June 23, 1931.  F. G. WORDEN  1,811,814
STUFFING BOX
Filed Nov. 30, 1925
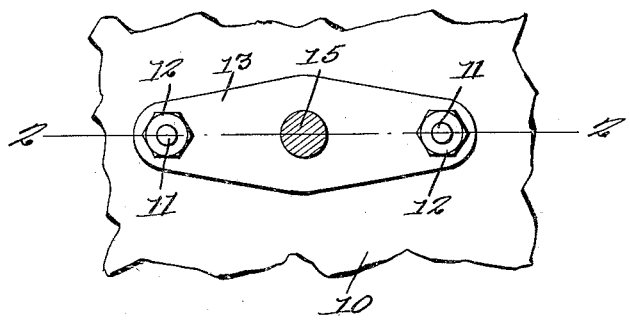
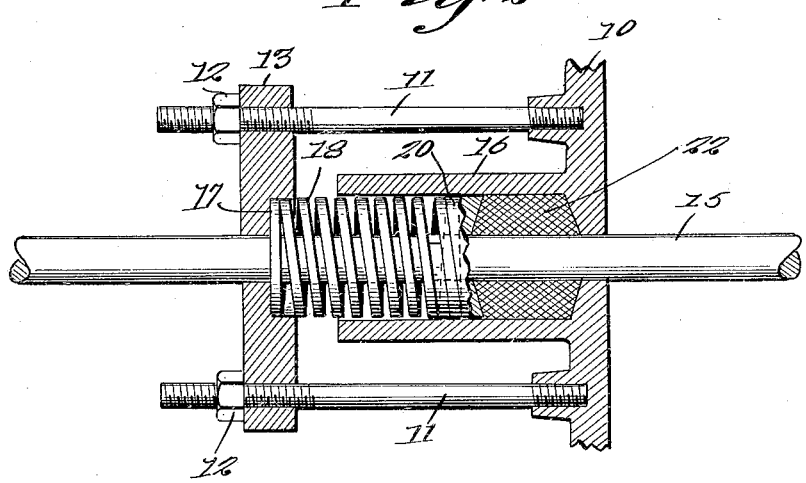
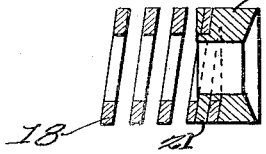
F. G. Worden INVENTOR Patented June 23, 1931

1,811,814

UNITED STATES PATENT OFFICE

FRANCIS G. WORDEN, OF BRINKLEY, ARKANSAS

STUFFING BOX

Application filed November 30, 1925. Serial No. 72,393.

The object of this invention is to provide means for resiliently retaining the body of packing in a stuffing box, so that the packing is permitted to expand incident to the operation of the piston within a cylinder to which the stuffing box is applied, thereby serving to better advantage the purpose for which the packing is employed.

A further object is to avoid the necessity of setting up the gland as tightly as is otherwise required, and to provide a packing and retaining means therefor which will be automatically adjustable, for meeting unfavorable conditions, due to wear and the tendency to throw the piston rods out of proper alinement.

With the foregoing and other objects in view, the invention consists in the novel construction and arrangement of elements described, illustrated and claimed, it being understood that modifications may be made within the scope of the claim, without departing from the spirit of the invention.

In the drawings forming part of this application,

Figure 1 is a view in top plan.

Figure 2 is a view in vertical section, on the line 2—2 of Figure 1.

Figure 3 is a vertical section through the spring and the element with which it cooperates.

A portion of the head of a cylinder, is shown at 10, being provided with threaded bosses into which rods or bolts 11 are screwed, the bolts having their upper end portions engaged by nuts 12 which retain the transverse element 13, adapted to adjustably support or retain the end of the resilient element referred to below.

A piston rod or the like designated 15 passes through the head 10, and through transverse element or plate 13, and also through the stuffing box 16 formed on head 10.

Element 13 is provided with a recess at 17, and a coiled spring 18 surrounding piston rods 15 enters the recess 17, and the major portion of the spring is received by the upper or outer ends of the stuffing box, the exterior diameter of the spring being approximately equivalent to the bore of box 16.

The gland 20 is provided with a flange 21 which fits into the end of the spring 18, and the gland contacts with the body of packing 22 and exerts yielding pressure thereon, in view of the fact that the gland is retained by spring 18, adjustably mounted, as before indicated.

In actual use, it is observed that the packing material is caused to expand during each movement of the piston, so that it is retained in good condition for a greater length of time, than the ordinary packing when compressed to a much greater extent than is required in the present instance. Element 20 may be cast to embrace the lower end of the spring as shown.

What is claimed is:

In a device of the class described, a box for receiving packing, a body of packing material therein, a gland bearing on said body and provided with a helical groove on the side opposite that portion contacting with the body of packing material, a spring extending into the box and retaining the gland in position, the end portion of the spring being threaded into said groove in the gland, the outer surfaces of the gland and of the spring where threaded being flush and adapted to contact with the walls of the box when an element mounted to reciprocate with reference to the box is slightly out of alinement, and an adjustably mounted element engaging the outer end of the spring.

In testimony whereof I affix my signature.

FRANCIS G. WORDEN.